(12) United States Patent
Nuthi

(10) Patent No.: US 8,713,377 B2
(45) Date of Patent: Apr. 29, 2014

(54) SYSTEM AND METHOD TO ASSESS SERVICEABILITY OF DEVICE

(75) Inventor: Sridhar Nuthi, Sussex, WI (US)

(73) Assignee: General Electric Company, Schenectady, NY (US)

( * ) Notice: Subject to any disclaimer, the term of this patent is extended or adjusted under 35 U.S.C. 154(b) by 311 days.

(21) Appl. No.: 13/327,004

(22) Filed: Dec. 15, 2011

(65) Prior Publication Data

US 2013/0159786 A1    Jun. 20, 2013

(51) Int. Cl.
*G06F 11/00* (2006.01)
(52) U.S. Cl.
USPC ......................................... 714/47.2
(58) Field of Classification Search
USPC ............................... 714/47.1–47.3
See application file for complete search history.

(56) References Cited

U.S. PATENT DOCUMENTS

| | | | |
|---|---|---|---|
| 5,958,010 A * | 9/1999 | Agarwal et al. | 709/224 |
| 6,430,276 B1 | 8/2002 | Bouvier et al. | |
| 6,675,149 B1 | 1/2004 | Ruffin et al. | |
| 7,254,747 B2 | 8/2007 | Osborn et al. | |
| 7,721,157 B2 * | 5/2010 | Spitz et al. | 714/47.2 |
| 7,756,678 B2 * | 7/2010 | Bonissone et al. | 702/182 |
| 2003/0028390 A1 | 2/2003 | Stern et al. | |
| 2003/0101076 A1 | 5/2003 | Zaleski | |
| 2004/0010446 A1 | 1/2004 | Vanska et al. | |
| 2004/0172581 A1 | 9/2004 | Tamura et al. | |
| 2009/0107219 A1 * | 4/2009 | Douglas | 73/61.63 |
| 2009/0129793 A1 * | 5/2009 | Milton et al. | 399/38 |
| 2010/0042452 A1 * | 2/2010 | Chen et al. | 705/7 |
| 2012/0192014 A1 * | 7/2012 | Kato | 714/47.1 |

* cited by examiner

*Primary Examiner* — Bryce Bonzo
(74) *Attorney, Agent, or Firm* — William T. Kryger

(57) ABSTRACT

A system and method to assess a serviceability of a machine having a field replaceable unit (FRU) is provided. A controller can perform the steps of tracking performance parameters of the machine; calculating and comparing a performance index; generating requests for service of the FRU of the machine based on the performance index, the requests for service not including replacement of the FRU; detecting completion of a events to service the FRU of the machine; calculating an asset healability index representative of a trend in the performance index over time between each of the events to service the FRU; and generating a request for replacement of the FRU instead of another request to service the FRU based on a comparison of the asset healability index relative to a second predetermined threshold.

20 Claims, 4 Drawing Sheets

| Complex Machine Identifier | FRU Identifiers In Mach. | No. of Service Actions Per Time Period | | Trend In AHI To | | Cost Analysis | | See Fig. 3 |
|---|---|---|---|---|---|---|---|---|
| | | Sv/No Replace | Replace | Service | Replace | Plan One | Plan Two | |
| | | 425 | 430 | 435 | 440 | | | |
| Totals | | | | | | | | |

415 — Complex Machine Identifier
420 — FRU Identifiers In Mach.

FIG. 4

SYSTEM AND METHOD TO ASSESS SERVICEABILITY OF DEVICE

TECHNICAL FIELD

The subject herein generally relates to a system and method to identify and assess a serviceability of a device, and more specifically, to automatically assess feedback of an effectiveness of an action in the servicing of device.

BACKGROUND

Hospitals and other medical facilities (e.g., imaging centers, cardiology treatment centers, emergency rooms, surgical suites, etc.) include many medical equipment devices operable to deliver diagnosis of admitted patients. In the field of complex medical equipment devices or systems, various techniques have been employed for detecting faults or serviceable conditions and for correcting them.

Early techniques were simply reactive and manual in character. As a fault condition or failure occurred, technicians or service personnel carried out manual troubleshooting operations to identify where the fault my have occurred and correct the malfunction. While such reactive actions are adequate on simple systems, such service strategy does not provide reliable and extendable service, and rely heavily on the experience and knowledge of the service personnel.

There are known approaches to more analytically and repeatedly identify faults and serviceable conditions in both a reactive and proactive manner. However, existing approaches do not address measurement and comparison of an effectiveness of service actions in a reliable and easy manner. For example, none of the approaches adequately address measuring and comparing an effectiveness of proposed service.

The above-mentioned problem can be addressed by the subject matter described herein in the following description.

BRIEF SUMMARY

The system and method of the subject matter described herein can be directed to provide measurement and comparative analysis of an effectiveness of multiple potential service actions or inaction. The system and method can provide improved customer satisfaction, confidence while reducing waste in costs and time for unnecessary replacement of parts or field replaceable units (FRUs). The system and method also can provide a service provider with enhanced ability to predict and plan inventory levels of FRUs without waiting to react for failures to occur.

According to one embodiment, a system to assess a serviceability of a machine having a field replaceable unit (FRU) is provided. The system can comprise a controller having a processor in communication to execute computer readable program instructions stored in a non-transitory medium, the program instructions representative of the steps of: tracking the performance parameter of the machine over time; calculating a performance index representative of a comparison of the measure of the performance parameter relative to a first predetermined threshold; generating a plurality of requests for service of the FRU of the machine based on the performance index, the plurality of requests for service not including replacement of the FRU; detecting completion of a plurality of events to service the FRU of the machine in response to the plurality of requests for service; calculating an asset healability index representative of a trend in the performance index over time between each of the events to service the FRU of the machine; and generating a request for replacement of the FRU of the machine instead of another request to service the FRU on the machine based on a comparison of the asset healability index relative to a second predetermined threshold.

According to another embodiment, a method to assess a serviceability of a machine, the method comprising the steps of: establishing a connection from a remote workstation to selectively communicate via a server over a network with the machine; tracking the performance parameter of the machine over time; calculating a performance index representative of a comparison of the measure of the performance parameter relative to a first predetermined threshold; generating a plurality of requests for service of a FRU of the machine based on the performance index, the plurality of requests for service not including replacement of the FRU; detecting completion of a plurality of events to service the FRU of the machine in response to the plurality of requests for service; calculating an asset healability index representative of a trend in the performance index over time between each of the events to service the FRU of the machine; and generating a request for replacement of the FRU of the machine instead of another request to service the FRU on the machine based on a comparison of the asset healability index relative to a second predetermined threshold.

Various other features, objects, and advantages of the invention will be made apparent to those skilled in the art from the accompanying drawings and detailed description thereof.

BRIEF DESCRIPTION OF THE DRAWINGS

FIG. 4 shows a schematic diagram of an embodiment of a graphic display that can include an embodiment of one or more components of FIG. 3 in combination with additional graphic illustrations produced by the system of FIG. 1 in accordance with the subject matter described herein.

DETAILED DESCRIPTION

In the following detailed description, reference is made to the accompanying drawings that form a part hereof, and in which is shown by way of illustration specific embodiments that may be practiced. These embodiments are described in sufficient detail to enable those skilled in the art to practice the embodiments, and it is to be understood that other embodiments may be utilized and that logical, mechanical, electrical and other changes may be made without departing from the scope of the embodiments. The following detailed description is, therefore, not to be taken as limiting the scope of the invention.

Figure 1:
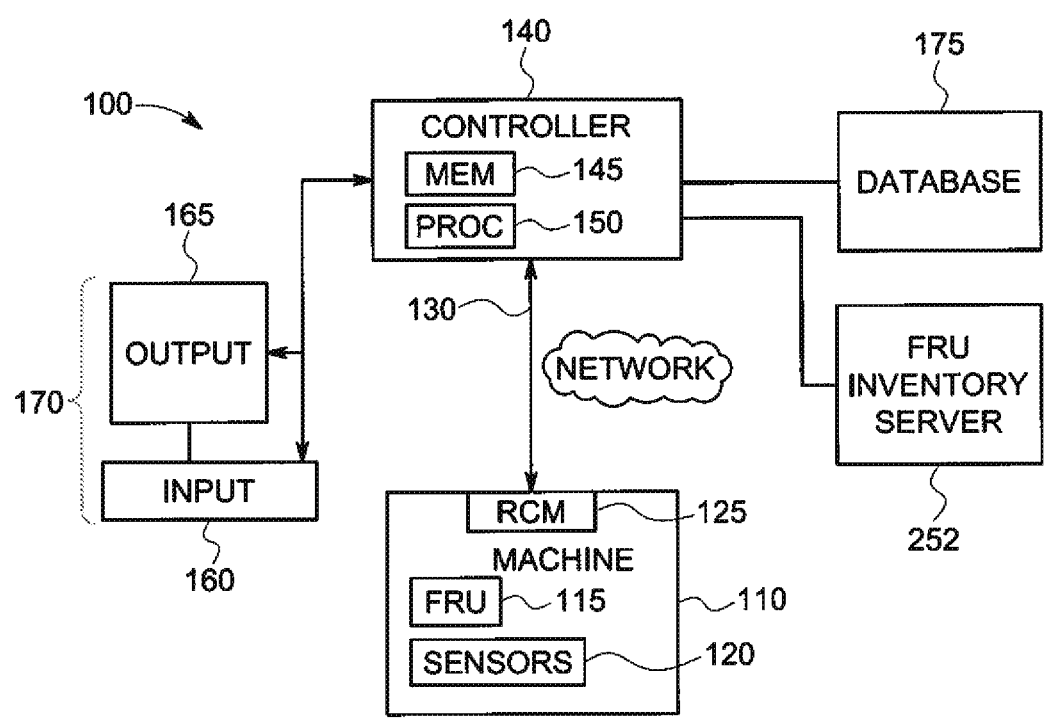
FIG. 1 is a schematic diagram of an embodiment of system to provide a novel technique for managing an effectiveness of service actions to a complex medical machine system in accordance to the subject matter described herein.

FIG. 1 illustrates a schematic diagram of an embodiment of a system 100 to provide a novel technique to manage an effectiveness of events to service a complex machine 110. In accordance to the subject matter described herein, the system 100 can perform measurement of effectiveness of a service action to complex machine 110 via a technique that includes calculation and tracking an asset healability index (AHI) (see FIG. 3 and described in more detail later) 105 over time with respect to service actions performed on the complex machine 110 for subsequent comparative analysis over time, as well as in determination of other candidate service actions or inaction.

The complex machine 110 can vary. Examples of the complex machine 110 include a radiological imaging system, a magnetic resonance imaging system, an ultrasound imaging system, an anesthesia machine, etc. The complex machine 110 can include multiple components and functions, as well as subsystems, and so forth. Certain of these features are illustrated in FIG. 1. In the illustrated complex machine 110, a subsystem can include various components such as filed replaceable units (FRUs) 115. It should be noted that as used herein, the term FRU 115 may include various components or parts (e.g., x-ray tubes, circuit boards, coolers, motors, etc.), as well as collections of components or parts that may carry out useful functions either in cooperation with one another or somewhat separately in operation of the subsystem of the complex machine 110. As will be appreciated by those skilled in the art, where desired, any number of subsystems may be designated are typically designated in complex systems by their functionality, interdependence separate manufacturability or service, ability, and so forth. FRUs 115, similarly, may be designed to facilitate servicing by simple replacement of packaged parts, routines, and so forth.

An embodiment of the complex machine system 110 can further include one or more sensors 120 in communication via a remote connectivity module 125 and a network 130 to the system 100. Examples of the sensors 120 can include voltage meters, current meters, heat thermocouples or other known thermal or heat sensors, vibration sensors, counters, quantity level sensors, etc. An example of the remote connectivity module 125 can be the INSITE™ product offered by GE HEALTHCARE™, an affiliate of the GENERAL ELECTRIC COMPANY™. Examples of the network 130 can include the Internet, intranet, local area network (LAN), etc. and is not limiting.

The system 100 can include a server or controller 140 with a memory (e.g., non-transitory storage medium) 145 operable to store a series of modules of programmable computer instructions for execution by at least one processor 150. Although the memory 145 and processor 150 are shown at the controller 140, it should be understood that each of the memory 145 or processor 150 can comprise multiple independent components, but still under the architecture of the system 100.

The controller 140 can be in communication with an input device 160 and an output device 165. Examples of the input device 160 include a keyboard, a touch screen or graphic interface, mouse, toggle switches, touch buttons, voice activation, etc. Examples of the output device 165 can include monitors, touch-screens or graphic interfaces, kiosks, speakers, etc. An embodiment of the input device 160 and output device 165 can also be constructed under a common interface 170.

The system 100 can further include a database 175 in communication to store and retrieve acquired and calculated data, as well as to store algorithms.

Figure 2:
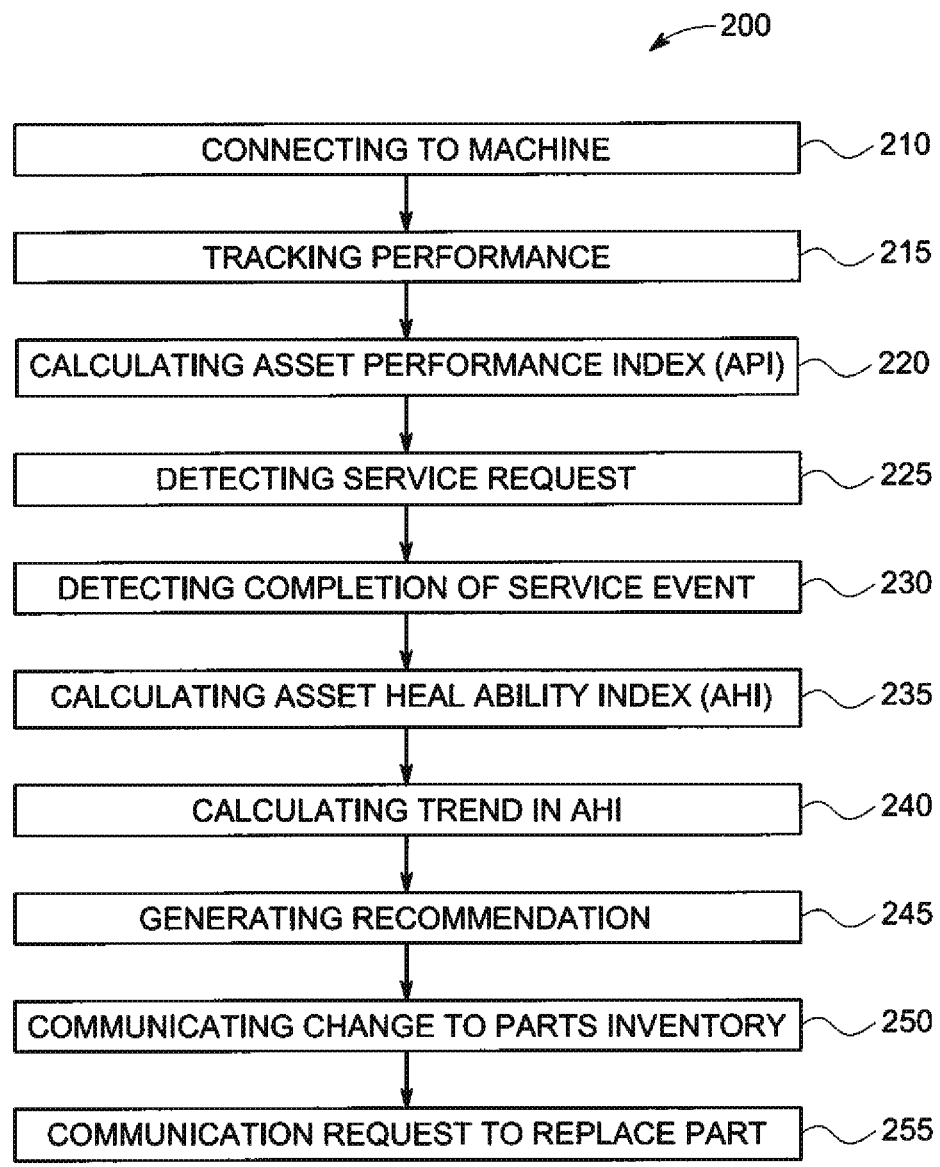
FIG. 2 is a schematic diagram illustrating a method of operating the system of FIG. 1 in managing an effectiveness of service actions to a complex medical machine system in accordance to the subject matter described herein.

Having described the above general construction of the system, the following is description of the system in the operation of a method 200 in accordance to the subject matter described herein and as described in FIG. 2. It should also be understood that the sequence of the acts or steps of the method 200 as discussed in the foregoing description can vary. Also, it should be understood that the method 200 may not require each act or step in the foregoing description, or may include additional acts or steps not disclosed herein. It should also be understood that one or more of the steps of the method 200 can be represented by a module of computer-readable program instructions stored in the memory 145 for execution by one or more processors 150 of the controller 140.

Figure 3:
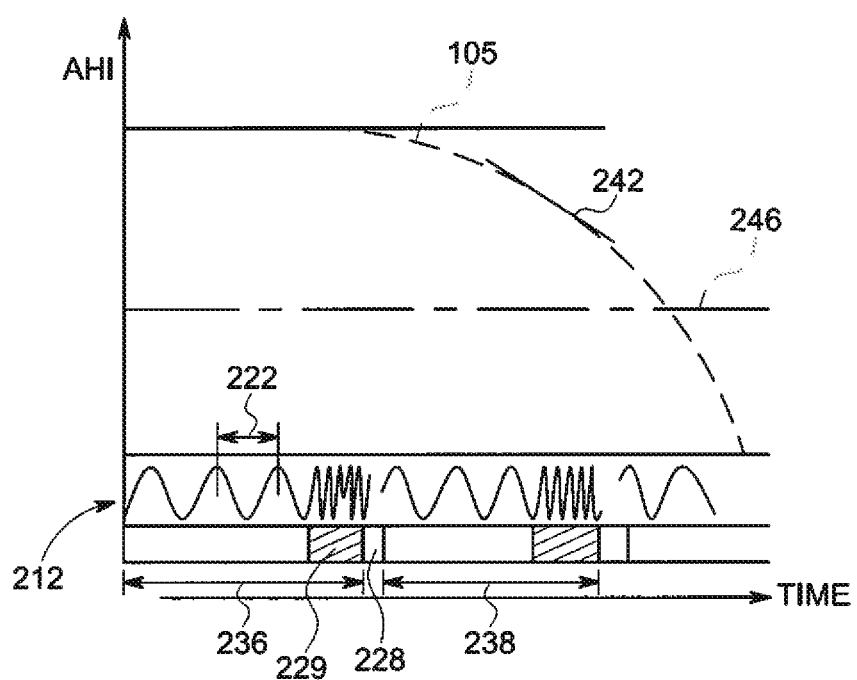
FIG. 3 illustrates a schematic diagram of an embodiment of calculating an asset healability index to evaluate of an effectiveness of service actions in accordance with the subject matter described herein.

Referring to FIGS. 2 and 3, step 210 includes establishing a connection from a controller 140 to selectively communicate over a network 130 with the machine 110. Step 210 can include connecting a connection module between the controller 140 and the server, and instructing the connection module to establish communication of the controller 140 to acquire a measure of a performance parameter 212 (see FIG. 3) of the machine 110.

Step 215 includes tracking the performance parameter 212 of the machine 110 over time. The performance parameter 212 can include one or more of the following: a temperature reading, an amperage reading, a power reading, a pressure reading, a stress reading, and a vibration reading.

Still referring to FIGS. 2 and 3, step 220 can include calculating an asset performance index (API) representative of a comparison of the measure of the performance parameter 212 relative to a first predetermined threshold 222 (e.g., wavelength, time period or frequency, amplitude, etc.). The first predetermined threshold 222 of the API can be based on a historic data of the machine 110 (see FIG. 1) stored in database connected in communication with the controller 140.

Step 225 includes detecting generation of a plurality of requests for a service event or action 228 to the FRU 115 of the machine 110 based on the asset API or a trend in the API that is indicative of a failure 229 (shown in cross-section), the plurality of requests for the service action 228 not including replacement of the FRU 115. A count or frequency of the plurality of requests for the service actions 228 to the FRU 115 on the complex machine 110 can be predictive prior to the failure 229 of the machine 110. Each of the requests for the service action 228 can include a first identified problem and a first proposed solution acquired from the database 175 based on the trend in the API over time, the database 175 connected in communication with the controller 140.

Step 230 includes detecting completion of the plurality of service actions 228 to the FRU 115 of the machine 110 in response to the plurality of requests for the service actions 228. An embodiment of the step 230 can include receiving a manual input of a report from a field engineer, or receiving an automatically generated instruction via the network 130 and the remote connectivity module 125 from the machine 110, or receiving an instruction via the network 130 from the field engineer performing the service action at the machine 110 via a laptop or the machine 110 itself. The type and method of communicating the completion of the service action 228 can vary.

Still referring to FIGS. 2 and 3, step 235 includes calculating the AHI 105. An embodiment of the AHI 105 can be representative of a trend in the API over time between each of the service actions 228 to the FRU 115 of the machine 110 (See FIG. 1). Referring to FIG. 3, calculating the AHI 105 can include applying a weighted average algorithm that can include comparing periods of time (236, 238) between each of the service actions 228 to service the FRU 115 on the machine 110 without replacing the FRU 115.

Step 240 can include calculating a trend 242 in the AHI 105 over time. The step 240 can includes calculating a change in slope of the AHI 105 over time, and wherein a substantially zero slope of the trend 242 in the AHI 105 is indicative of an effective event to service the FRU 115 on the machine 110 to a substantially original condition.

Step 245 includes automatically generating a recommendation to do one of communicating the request for the service action 228 to the FRU 115 of the machine 110 without the replacement of the FRU 115 versus the request for the service action 228 to replace the FRU 115. The step 245 of generating the recommendation can be based on a comparison of the trend 242 in the AHI 105 relative to a second predetermined threshold 246. The recommendation can include a cost benefit analysis of a first service action plan that includes an estimated cost, man-hours and machine down-time to continuing service actions to the machine 110 without replacement of the FRU 115, versus the estimated cost, man-hours, and machine down-time associated with a second service action plan to replace the FRU 115.

Step 250 can include detecting if the recommendation is to request to replace the FRU 115, and if so, automatically communicating the request to a parts or FRU inventory server 252 (see FIG. 1). Step 250 can further include automatically communicating an instruction to the FRU inventory server 252 to change in an inventory level of the FRU 115 based on the recommendation in step 245 or based on a comparison of the trend 242 in the AHI 105 to another threshold.

FIG. 4 illustrates an example of a graphic output display 400 generated by the system 100 and method 200. The graphic output display 400 can include a combination of one or more elements of the AHI 105, trend 242, thresholds 222 and 246, performance parameter 212, time periods 236 and 238, etc., and/or alphanumeric values of the same, as shown by the reference to see FIG. 3. When the input 160 such as a mouse is utilized in combination with the graphic display 400, placing the input 160 over a specific point on the dashed line of AHI 105 can trigger generating a graphic illustration of respective, specific calculated values of AHI 105 at a specific point in time associated with the placement of the input 160. The graphic output display 400 can further include a graphic illustration 415 of an identifier of the machine 110, a list 420 of identifiers of the FRUs 115 associated with the machine 110, graphic illustrations 425, 430 of a historical or statistical (e.g., average, mode, standard deviation, etc.) number (reference by abbreviation no.) of service events/actions 228 per time period for each FRU 115 where no replacement occurred versus or for comparison to the number of service actions 228 to replace the FRU 115, graphic illustrations 435, 440 of the trend 242 or threshold 246 in the AHI 105 to service without replacement versus or for comparison to trend 242 or threshold 246 in AHI 105 when to replace each FRU 115, and graphic illustrations 250, 255 of estimated or projected cost analyses of multiple plan to service the machine 110 over a predetermined or input time period. For example, one action plan can be associated with service actions without replacement of the FRU 115 over a projected time period (can be input by the user) versus or for comparison to a second action plan that includes the service action to replace the FRU 115. In another example, first and second action plans can be estimated or projected costs over a first time period (either predetermined or input) or different time periods) associated with different projected number of service actions without replacement of the FRU 115 in combination with different projected number of service events/actions that include replacement of the FRU 115 based on one or more measured AHIs 105 in combination with statistical data thereof as described above, which can be summated over multiple FRUs 115 to calculate projected costs of the first and second action plans with respect to the overall machine 110 over time.

If recommendation to replace the FRU 115, step 255 includes generating a request to order the FRU 115 and scheduling of the field personnel or engineer for the service action request to replace the FRU 115 on the complex machine 110.

A technical effect of the above-described system 100 and method 200 includes providing a reliable measure of effectiveness of service actions to FRUs 115 of complex machines 110, thereby enhancing customer costs, confidence and satisfaction. The API provides the measure of how well the FRU 115 and/or the machine 110 is operating, while the AHI 105 provides a measure of how well an intervention or actions to service or solve a problem with the machine 110 is working. The system 100 and method 200 provide a direct and positive means to enhance problem identification and best service practices, thereby providing cost savings to the customer. The system 100 and method 200 can also provide for planning when to service the FRU 115 at a lower cost versus replacement of the FRU 115 at a higher cost. Thereby, the system 100 and method 200 can provide for cost benefit analysis going forward in servicing the machine 110. The system 100 and method 200 can also provide for managing inventory of FRUs 115 prior to actual events of failure 229 of the machine 110.

In an example of another technical effect, as the system 100 acquires historical data of trends in AHI 105 over time, the system 100 can generate comparisons of trends in AHI 105 of parts or FRUs 115 or thresholds thereof over time for comparison in graphic illustrations to the user. Over time, another technical effect of the system 100 and method 200 can be to provide data for graphic illustration to the user of a statistical number (e.g., average, mode, median, standard deviation, etc.) of requests for the service action 228 to the FRU 115 of the machine 110 without the replacement of the FRU 115 versus the request for the service action 228 to replace the FRU 115 for multiple FRUs 115 of the complex machine 110.

This written description uses examples to disclose the subject matter, including the best mode, and also to enable one skilled in the art to make and use the invention. The patentable scope of the subject matter is defined by the following claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

I claim:

1. A system to assess a serviceability of a machine having a field replaceable unit (FRU), the system comprising:
   a controller having a processor in communication to execute computer readable program instructions stored in a non-transitory medium, the program instructions representative of the steps of:
   tracking the performance parameter of the machine over time;
   calculating a performance index representative of a comparison of the measure of the performance parameter relative to a first predetermined threshold;
   generating a plurality of requests for service of the FRU of the machine based on the performance index, the plurality of requests for service not including replacement of the FRU;
   detecting completion of a plurality of events to service the FRU of the machine in response to the plurality of requests for service;
   calculating an asset healability index representative of a trend in the performance index over time between each of the events to service the FRU of the machine; and generating a request for replacement of the FRU of the machine instead of another request to service the FRU on the machine based on a comparison of the asset healability index relative to a second predetermined threshold.

2. The system of claim 1, wherein the plurality of events to service the FRU on the machine are predictive prior to a failure of the machine.

3. The system of claim 1, wherein the database receives the performance index over time between each of the events to service the FRU of the machine communicated from the controller.

4. The system of claim 1, further comprising a FRU server connected in communication with the controller, wherein the computer readable program instructions are further representative of the steps of:
  Automatically communicating an instruction to change in an inventory level of the FRU based on the trend of the asset healability index relative to the threshold.

5. The system of claim 1, wherein the first predetermined threshold of the performance index is based on a historic data of the machine stored in database connected in communication with the controller.

6. The system of claim 1, wherein the performance parameter consists of one of the group comprising: a temperature reading, an amperage reading, a power reading, a pressure reading, a stress reading, and a vibration reading.

7. The system of claim 1, wherein each of the requests to service the FRU includes a first identified problem and a first proposed solutions acquired from a database based on the trend in the performance index over time, the database connected in communication with the controller.

8. The system of claim 1, wherein the trend in the asset healability index is calculated from an algorithm including a comparison of a period of time between each of the plurality of events to service the FRU on the machine without replacing the FRU.

9. The system of claim 1, further comprising a remote connectivity module operable to selectively connect communication of the controller with the machine, and
  wherein the computer readable program instructions are further representative of the step of:
  instructing the connection module to establish communication of the controller to receive a measure of a performance parameter of the machine.

10. The system of claim 1, wherein calculating the trend in the asset healability index includes calculating a change in slope of the asset healability index over time, and wherein a substantially zero slope of the trend in the asset healability index is indicative of a 100 percent effectiveness of an event to service the FRU on the machine to a substantially original condition.

11. A method to assess a serviceability of a machine, the method comprising the steps of:
  establishing a connection from a remote workstation to selectively communicate via a server over a network with the machine;
  tracking the performance parameter of the machine over time;
  calculating a performance index representative of a comparison of the measure of the performance parameter relative to a first predetermined threshold;
  generating a plurality of requests for service of a FRU of the machine based on the performance index, the plurality of requests for service not including replacement of the FRU;
  detecting completion of a plurality of events to service the FRU of the machine in response to the plurality of requests for service;
  calculating an asset healability index representative of a trend in the performance index over time between each of the events to service the FRU of the machine; and
  generating a request for replacement of the FRU of the machine instead of another request to service the FRU on the machine based on a comparison of the asset healability index relative to a second predetermined threshold.

12. The method of claim 11, wherein the plurality of events to service the FRU on the machine are predictive prior to a failure of the machine.

13. The method of claim 11, further comprising the step of a database receiving the performance index over time between each of the events to service the FRU of the machine communicated from the remote workstation.

14. The method of claim 11, further comprising the steps of:
  connecting an interface in communication between the remote workstation and a FRU server; and
  instructing a change in an inventory level of the FRU based on the trend of the asset healability index relative to the threshold.

15. The method of claim 11, wherein the first predetermined threshold of the performance index is based on a historic data of the machine stored in database connected in communication with the remote workstation.

16. The method of claim 11, wherein the performance parameter consists of one of the group comprising: a temperature reading, an amperage reading, a power reading, a pressure reading, a stress reading, and a vibration reading.

17. The method of claim 11, wherein each of the service requests includes a first identified problem and a first proposed solution acquired from a database based on the trend in the performance index over time, the database connected in communication with the remote workstation.

18. The method of claim 11, wherein calculating the trend in the asset healability index includes calculating form a weighted average algorithm including comparing a period of time between each of the plurality of events to service the FRU on the machine without replacing the FRU.

19. The method of claim 11, further comprising the step of connecting a connection module between the remote workstation and the server, and
  instructing the connection module to establish communication of the remote workstation via the server to acquire a measure of a performance parameter of the machine.

20. The method of claim 11, wherein the step of calculating the trend in the asset healability index includes calculating a change in slope of the asset healability index over time, and wherein a substantially zero slope of the trend in the asset healability index is indicative of an effective event to service the FRU on the machine to a substantially original condition.

* * * * *